L. R. WRIGHT.
Cultivators and Plows.
No. 133,614. Patented Dec. 3, 1872.
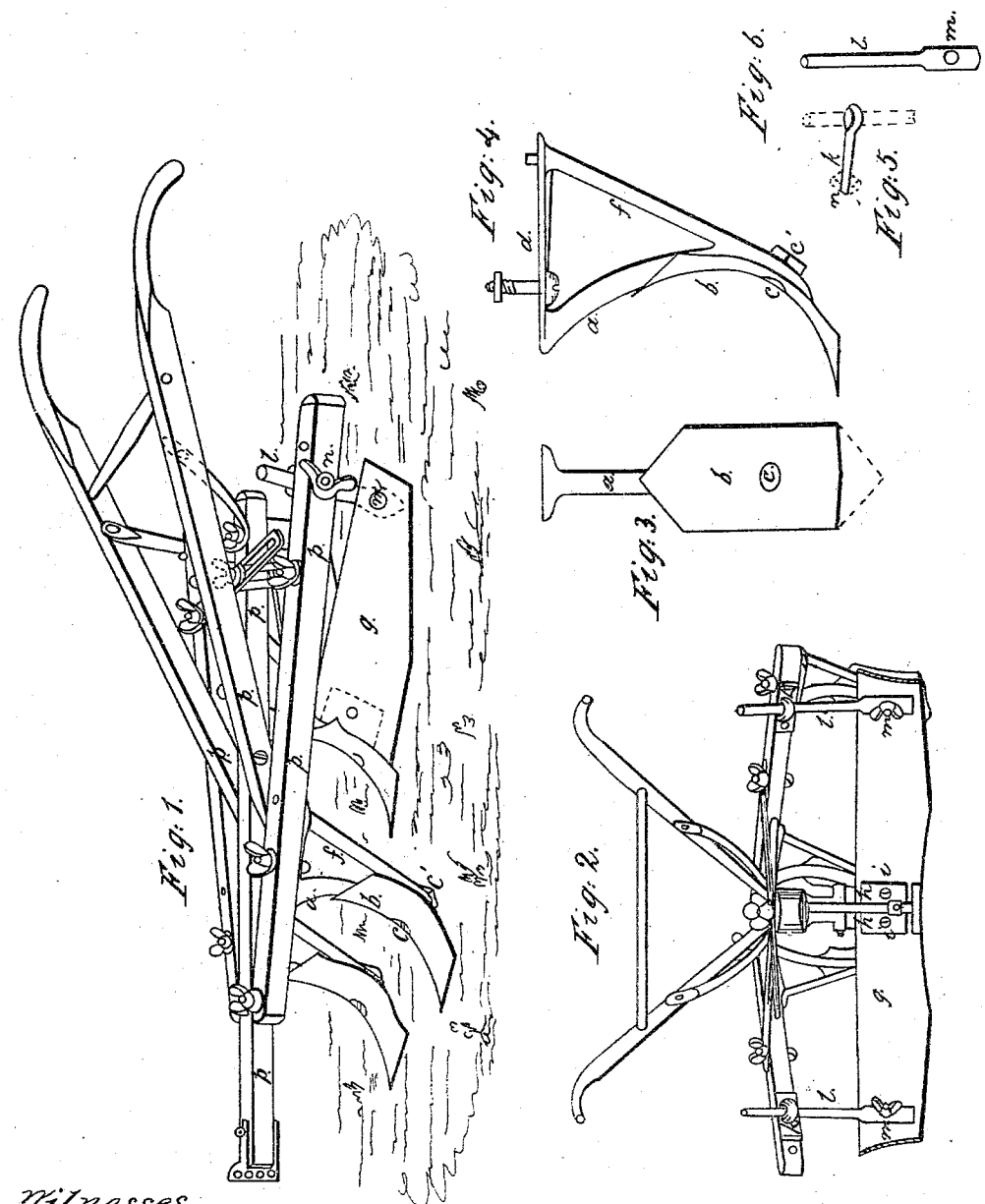
Witnesses
Richard W. Reille
Clark Brownell
Inventor
Lewis R. Wright

UNITED STATES PATENT OFFICE.

LEWIS R. WRIGHT, OF TROY, NEW YORK.

IMPROVEMENT IN CULTIVATORS AND PLOWS.

Specification forming part of Letters Patent No. 133,614, dated December 3, 1872.

*To all whom it may concern:*

Be it known that I, LEWIS R. WRIGHT, of the city of Troy, in the county of Rensselaer and State of New York, have invented certain Improvements in Cultivators and Plows, of which the following is a specification:

The nature of my invention consists in the construction and arrangement of the various parts of a cultivator and plow, as will be more fully hereinafter set forth.

*Description of the Accompanying Drawing.*

Figure 1 is a view of the cultivator complete, viewed from one side, in perspective. Fig. 2 is a perspective view of the cultivator complete, from the rear. Fig. 3 is a front view of the cultivator-tooth with its standard. Fig. 4 is a side view of the tooth and its standard. Fig. 5 is a view of the eyebolt. Fig. 6 is a view of the circular standard to go with the eyebolt at the back end of the cultivator.

*General Description.*

In Figs. 3 and 4 the standard is shown, tooth attached. $a$ represents the curved edge. $b$ represents the tooth. $c$ is the bolt, secured by a nut at $c'$. At $d$ is the upper edge of the standard, which is flat, and having the aperture $e$ through which the bolt passes when attached to the cultivator-frame. $f$ is the brace behind. The tooth is in the usual form, and, being already mentioned in a former patent, is only shown in the drawing for the purpose of showing its correspondence with the curve of the standard, the whole forming one continuous curve, as shown in Fig. 4, and has the effect of turning the soil over forward and breaking it up.

In Figs. 1 and 2 the steel mold-board is shown, marked $g$, and the standard or wing to which it is attached is marked $h$. The bolt which forms its connection is marked $i$, and is secured by a nut, as usual, and it forms a pivot upon which the mold-board moves.

The eyebolt and standard therefor are shown in Figs. 5 and 6, the bolt marked $k$, and the standard marked $l$. The standard is secured to the mold-board by rivet, shown at $m$, and the whole secured by a nut or its equivalent, shown at $n$. By sliding the standard upward or downward through the eyebolt $k$ the mold-board is raised or lowered, the nut $n$ holding it to its position. The frame of the cultivator is marked $p$.

The above is intended as an improvement upon the cultivator patented to me and numbered 81,054.

*Claims.*

1. The curved standard $a$, top bar $d$, inclined brace $f$, all of one piece of metal, and the curved tooth $b$, secured by the bolt $c$, all secured to the under side of the frame by the bolt and nut passing through the top bar $d$ and the beam $p$, as shown and described.

2. In combination with the frame-beams $p$ $p$ $p$, I claim the hinged wings $h$ $h$, shares $g$ $g$, pivots $i$ $i$, movable rods $l$ $l$, and eyebolts $k$ $k$, all constructed and arranged to operate substantially as set forth.

LEWIS R. WRIGHT.

Witnesses:
 RICHARD H. REILLE,
 CLARK BROWNELL.